United States Patent
Eilemann et al.

(12) 
(10) Patent No.: US 6,279,866 B1
(45) Date of Patent: Aug. 28, 2001

(54) HOLDING DEVICE FOR A MOTOR, PARTICULARLY AN ELECTRIC FAN WHEEL MOTOR

(75) Inventors: Andreas Eilemann, Korntal-Muenchingen; Manfred Fuchs; Joachim Gehrig, both of Stuttgart; Christoph Hipp-Kalthoff, Simmozheim; Juergen Otto, Illingen; Gunnar Schlinke; Paul Zerelles, both of Stuttgart, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 08/989,238

(22) Filed: Dec. 12, 1997

(30) Foreign Application Priority Data

Dec. 12, 1996 (DE) .............................. 196 51 735

(51) Int. Cl.[7] ...................................... F16M 1/00
(52) U.S. Cl. ............................ 248/638; 248/603
(58) Field of Search .................. 248/638, 568, 248/603, 618, 619, 621, 632, 634, 678; 310/51

(56) References Cited

U.S. PATENT DOCUMENTS

| | | | | |
|---|---|---|---|---|
| 2,838,262 | * | 6/1958 | Anderson | 248/603 |
| 2,881,995 | * | 4/1959 | Neher | 248/632 X |
| 2,935,279 | * | 5/1960 | La Porte et al. | 248/632 |
| 3,154,704 | * | 10/1964 | Shaffer | 310/51 |
| 3,601,502 | * | 8/1971 | Harter | 248/634 X |
| 3,746,894 | | 7/1973 | Dochterman et al. | 310/51 |
| 4,161,667 | | 7/1979 | Buckman et al. | 310/51 |
| 4,191,240 | * | 3/1980 | Rule et al. | 165/79 |
| 4,432,528 | * | 2/1984 | Kretchman et al. | 248/638 |
| 4,643,386 | * | 2/1987 | Chastine | 248/632 |
| 4,648,579 | * | 3/1987 | Wilson | 248/638 |
| 4,730,994 | * | 3/1988 | Maertens | 417/572 |
| 4,746,092 | | 5/1988 | Hayashi et al. | 248/638 |
| 4,946,351 | * | 8/1990 | Richardson, Jr. | 248/638 X |
| 4,964,609 | * | 10/1990 | Tomell | 248/638 |
| 5,005,251 | * | 4/1991 | McLeod et al. | 15/327.1 |
| 5,069,413 | * | 12/1991 | Carson et al. | 248/638 |

FOREIGN PATENT DOCUMENTS

| | | |
|---|---|---|
| 35 00 867 | 7/1986 | (DE) . |
| 36 38 393 | 8/1988 | (DE) . |
| 91 08 745 | 12/1992 | (DE) . |
| 43 29 804 | 3/1995 | (DE) . |
| 195 04 970 | 8/1996 | (DE) . |
| 0 545 003 | 8/1992 | (EP) . |
| 0 642 206 | 3/1995 | (EP) . |
| 199769 * | 11/1965 | (SE) .................... 248/603 |

* cited by examiner

*Primary Examiner*—Anita M. King
(74) *Attorney, Agent, or Firm*—Crowell & Moring, LLP

(57) ABSTRACT

A holding device for a motor, particularly for an electric fan wheel motor of a heating or air condition system of a motor vehicle, having an adapter which can be fixed on an exterior motor component and surrounds it at least partially on the circumference side, as well as having a motor holder connected with the adapter and having at least one vibration-uncoupling supporting element. According to the invention, primarily axially stressed supporting elements are provided between axially spaced parts of the adapter, on the one hand, and of the motor holder, on the other hand, or between the exterior motor component and a bottom surface of a cup-shaped adapter which can be fixed thereto, or such supporting elements which are mounted radially between motor holder fastening arms and adapter holding fingers, while being fastened on one part and engaging form-lockingly in receiving pockets on the other part. The holding device may be used, for example, for holding a fan motor of a motor vehicle air-conditioning system with a low vibration transmission and a reduced contribution to the noise development caused by the motor holder.

21 Claims, 3 Drawing Sheets

HOLDING DEVICE FOR A MOTOR, PARTICULARLY AN ELECTRIC FAN WHEEL MOTOR

BACKGROUND AND SUMMARY OF THE INVENTION

This application claims the priority of German application 196 51 735.4, the disclosure of which is expressly incorporated by reference herein.

The invention relates to a holding device for a motor. Such holding devices are used, for example, for linking an electric motor for a fan wheel of a heating or air-conditioning system of a motor vehicle to corresponding housing parts of the heating or air-conditioning unit or vehicle body parts. A known difficulty in this case is to achieve a transmission of vibrations which is as low as possible, for which the vibration-uncoupling support element or elements are used, and to minimize the noise caused by the motor holder.

A holding device of the initially mentioned type is known from European Published Patent Application EP 0 642 206 A1. There, the adapter contains a bottom surface which can be fixed to a front end of an exterior motor component, which is formed by the pole ring of an electric motor, and holding fingers which project axially from the bottom surface and on whose radial exterior side rubber-elastic supporting elements are mounted. By way of these supporting elements, the adapter is connected with axially extending fastening webs and project from radial webs of the motor holder, these radial webs connecting two concentric rings of the motor holder with one another. The supporting elements are mounted on the holding fingers of the adapter and, radially on the outside, have detent noses by means of which they are locked into detent openings of the fastening webs of the motor holder.

For the vibration uncoupling and noise reduction on a housing or a vehicle, it is known from European Published Patent Application EP 0 545 003 A2 to arrange strip-shaped, rubber-elastic supporting elements between the pole ring of an electric motor and a motor holder. In an embodiment, supporting elements are form-lockingly connected with the motor holder. In order to secure the electric motor in the axial direction, the pole ring is provided with one recess or several recesses into which button-shaped projections engage of the supporting elements used as the supporting devices. In the case of another embodiment, the motor holder is connected by means of rubber-elastic supporting elements with the bearing bracket of the electric motor.

From German Utility Patent DE 91 08 745 U1, it is known to provide a holding body made of rubber-elastic material with a surrounding ring part which spans around an intermediate bush surrounding a stator of an electric motor and holds it on a motor holder. In the case of this construction, three arm parts are additionally provided which are uniformly distributed along the circumference, are molded onto the ring part and cause an additional support between the motor housing and the intermediate bush.

An object of the invention is to provide a holding device achieving a further improved vibration uncoupling and reduction of noise.

This and other objects have been achieved to the present invention by providing a holding device for a motor, comprising: an adapter defining a longitudinal axis and having a bottom surface to be fixed to an exterior motor component, said adapter having a plurality of holding fingers which project axially away from the bottom surface to respective free end areas which are bent radially to the outside; a motor holder having a plurality of radially extending fastening arms; and a plurality of vibration-uncoupling supporting elements disposed axially between said free end areas and said fastening arms, respectively.

This and other objects have been achieved to the present invention by providing a holding device for a motor, comprising: an adapter defining a longitudinal axis and having a bottom surface to be fixed to an exterior motor component, said adapter having a plurality of holding fingers projecting axially away from the bottom surface to respective free end areas; a motor holder having a ring, a plurality of connection webs extending radially inwardly from said ring, and a respective plurality of fastening arms extending axially from said connection webs at a distance from said longitudinal axis; and a plurality of supporting elements disposed radially between said free end areas of the holding fingers and respective of said fastening arms, said supporting elements being mounted in receiving pockets located in one of a radial interior side of the fastening arms and a radial exterior side of the holding fingers.

This and other objects have been achieved to the present invention by providing a holding device for a motor, comprising: a cup-shaped adapter having a bottom surface to be fixed to an exterior motor component; a motor holder connected with a shell surface of the adapter, and a plurality of vibration-uncoupling supporting elements disposed between said bottom surface of the adapter and said exterior motor component.

This and other objects have been achieved to the present invention by providing a holding device for a motor, comprising: an annular motor holder defining a plane and defining a longitudinal axis perpendicular to said plane; a plurality of fastening arms extending at least partially radially inwardly from said motor holder; an adapter arranged radially inside and coaxial with said holder, said adapter having a bottom surface essentially parallel to and spaced at a distance from said plane, said adapter including a plurality of holding fingers extending from said bottom surface at least partially parallel to said longitudinal axis and ending at free end areas, said plurality of holding fingers corresponding in number to said plurality of fastening arms; and a plurality of vibration-uncoupling supporting elements disposed between said fastening arms and said free end areas, respectively.

According to the holding device of the present invention, the vibration-uncoupling supporting elements are inserted between axially spaced sections of the adapter, on the one hand, and the motor holder, on the other hand. In this manner, vibrations of a motor held by it are converted to axial loads of the supporting elements and can thereby be absorbed by the latter in a very effective manner. The whole motor holding device can have a very compact construction and can be mounted in a very simple fashion. It was found that a motor held by means of this holding device can run smoothly and with a low emission of noise. In particular, the supporting elements can be positioned at a comparatively large axial distance from a fan wheel driven by the held motor which minimizes the development of noise because of the air which is taken in by the fan wheel and flows past parts of the motor holder and/or of the adapter.

According to certain preferred embodiments, the motor holder has several fastening arms which are situated on a common circular line, extend axially and are connected via connection webs with an otherwise open ring, the connection webs being situated in a plane which is parallel to the longitudinal axis of the holding device. On the one side, the adapter is fixed to an exterior component of the motor to be held and, on the other side, by means of corresponding holding fingers to the fastening arms of the motor holder by means of vibration-uncoupling supporting elements. The supporting elements have a rubber-elastic construction and are mounted either on the fastening arms of the motor holder or the adapter holding fingers, in which case they are inserted on the respective other part in the receiving pockets provided there. A holding device which is constructed in this manner can be easily mounted and it was found that it has a fluidically advantageous shape which only minimally influences the air flow path for a fan wheel which is driven by the held motor.

According to certain preferred embodiments, the adapter has a cup-shaped construction, the motor to be held being insertable into the adapter cup. Characteristically, in the case of this holding device, the vibration-uncoupling supporting elements are arranged on the face as a component of the connection of the adapter and the exterior motor component; that is, the cup bottom of the adapter is connected via the supporting elements in a vibration-uncoupled manner with the corresponding front end of the exterior motor component. By means of its shell surface, the adapter is fixed to the motor holder, in which case no additional vibration uncoupling must be provided for this connection. This holding device permits a one-piece motor holder—adapter implementation and provides an arrangement of the supporting elements which is favorable with respect to loads and has an axial main loading direction. By means of the shell surface of the adapter, a smooth flow surface is provided for air taken in by a fan wheel driven by the motor. On the whole, this, in turn, results in a low vibration transmission and a reduced noise proportion while the mounting is easy.

According to certain preferred embodiments, the bottom surface of the cup-shaped adapter can be fixed on the corresponding front end of the exterior motor component in a special manner which is particularly advantageous with respect to the uncoupling of vibrations. The connection takes place at several points which are all situated on a first diameter line, with the insertion of first supporting elements. This permits a slight pitching movement of the thus fixed motor vertically to this diameter line, which is advantageous with respect to the uncoupling of vibrations. In order to limit this pitching movement and prevent a striking of the motor on the motor holder, second supporting elements are arranged between the adapter bottom surface and the adjoining front end of the exterior motor component outside this diameter line, for example, along a second diameter line, which extends in a non-parallel, preferably vertical manner with respect to the first diameter line.

A holding device further developed according to certain preferred embodiments is provided for a motor of a multi-flow fan which has at least two fan flow channel stages situated axially behind one another. In the case of this holding device, the cup-shaped adapter extends with its open cup end area axially beyond the exterior motor component, such as a motor pole ring, to at least the height of a first one of the fan flow channel stages, for example, into the transition area of two fan flow channel stages which are situated axially behind one another. It was found that by means of this cup-type casing of the motor, a particularly low noise contribution can be achieved.

Other objects, advantages and novel features of the present invention will become apparent from the following detailed description of the invention when considered in conjunction with the accompanying drawings.

DETAILED DESCRIPTION OF THE DRAWINGS

The different holding devices illustrated in FIGS. 1 to 6 are particularly suitable for the vibration-uncoupled holding device of a fan motor of a heating or air-conditioning system in a motor vehicle on corresponding support parts which are fixed to the vehicle and on which one motor holder respectively is mounted which forms a part of the holding device. All illustrated embodiments cause a low vibration transmission from the fan motor to the air-conditioning system and a reduction of the noise proportion caused by the holding device, this being achieved by means of different constructive designs of the holding device, which will be discussed in detail in the following with respect to the individual embodiments.

Figure 1:
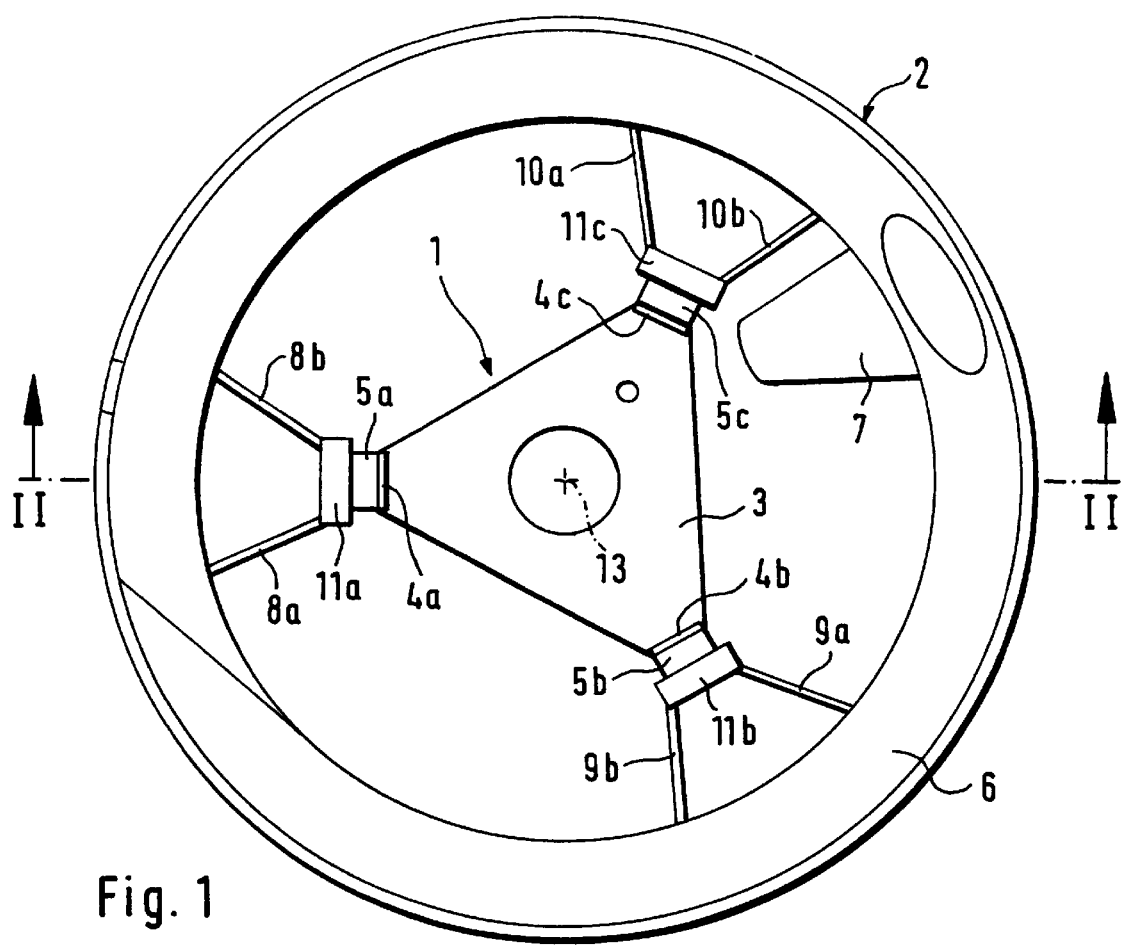
FIG. 1 is a top view of a motor holding device according to a preferred embodiment of the present invention with supporting elements inserted radially between the motor holder and the adapter.
Figure 2:
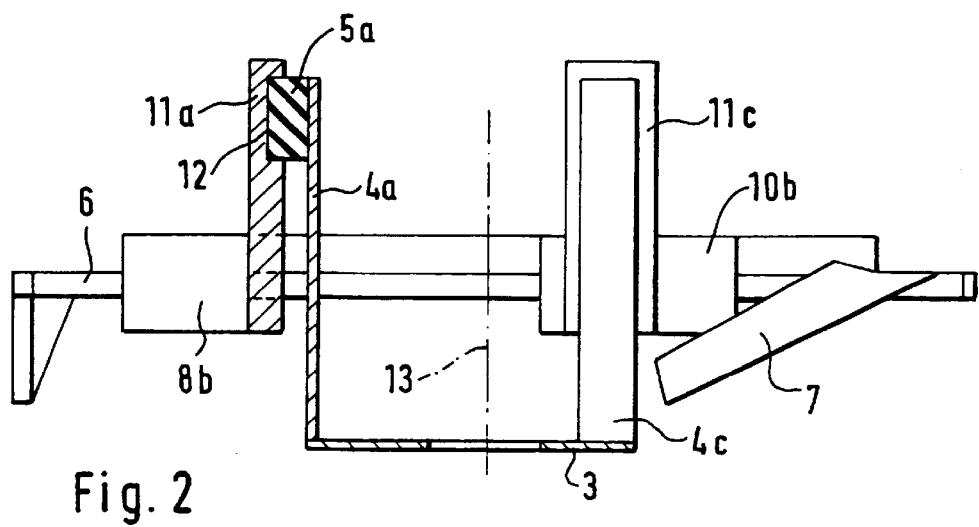
FIG. 2 is a sectional view along Line II—II of FIG. 1.

In the case of the holding device illustrated in FIGS. 1 and 2, a vibration uncoupling which acts mainly in the radial direction is provided between an adapter 1 and a motor holder 2. The adapter 1 contains a triangular bottom surface 3 which can be fixed, for example, by screwing, to a front end of the motor which is to be received and is not shown, and for this purpose, is provided with matching openings. Three holding fingers 4a, 4b, 4c project vertically, that is, axially from the bottom surface 3 and are arranged on the same radius and at an equidistant angular distance of 120° in the three triangular point areas of the bottom surface 3. On the radial exterior sides of the free end areas of the holding fingers 4a, 4b, 4c, one parallelepiped-shaped rubber-elastic supporting element 5a to 5c respectively is mounted which is made of a silicone material.

The motor holder 2 contains a ring 6 which can be rigidly mounted on a support part, such as a housing part of an air-conditioning system. For supplying motor cooling air, the motor holder 2 has a cooling air nozzle 7 which points from the ring 6 diagonally axially and radially toward the interior. Three pairs of connection webs 8a, 8b; 9a, 9b; 10a, 10b project from the ring 6 radially toward the inside, of which each pair holds an axially extending fastening arm 11a, 11b, 11c on the radially interior end. Corresponding to the adapter holding fingers 4a, 4b, 4c, the fastening arms 11a, 11b, 11c are situated on the same radius at an equidistant angular distance of 120° and have rectangular recesses 12 on their side radially pointing to the interior, in which the supporting elements 5a, 5b, 5c mounted on the holding fingers 4a, 4b, 4c can be inserted in a form-locking manner for the vibration-uncoupling mounting of the adapter 1 on the motor holder 2. In the case of this mounting, the holding fingers 4a, 4b, 4c are pressed slightly toward the inside and the adapter 1 is axially advanced into the motor holder 2 until the supporting elements 5a, 5b, 5c snap into their receiving devices 12.

It was found that, by means of this holding device, a motor can be held which will run smoothly and only low implementation and mounting expenditures are required. Occurring vibrations of the motor which must be rigidly connected with the adapter 1 are absorbed by silicone supporting elements 5a, 5b, 5c. In addition, the illustrated holding device causes only comparatively low air flow noise in the case of the accommodation of a fan motor. The reason is that the air taken in by a fan wheel, which is driven by the motor and which is situated axially in front of the holding fingers 4a, 4b, 4c and the fastening arms 11a, 11b, 11c can in a largely unhindered manner flow in from the holding device because the fastening arms 11a, 11b, 11c have a relatively large distance from the fan wheel which is not shown, and the connection webs 8a to 10b are situated in planes extending in parallel to the longitudinal axis 13 of the adapter so that they present no significant flow resistance to the axially taken-in air. By means of the form-locking receiving devices 12 in the fastening arms 11a to 11c, no detent noses or the like need to be molded to the supporting elements 5a to 5c which, on the one hand, is advantageous with respect to manufacturing and, on the other hand, in the case of given dimensions of the motor to be received, permits a comparatively small radial dimension of the adapter 1 which allows the fluidically favorable, large distance of the fastening arms 11a to 11c from the fan wheel.

Figure 3:
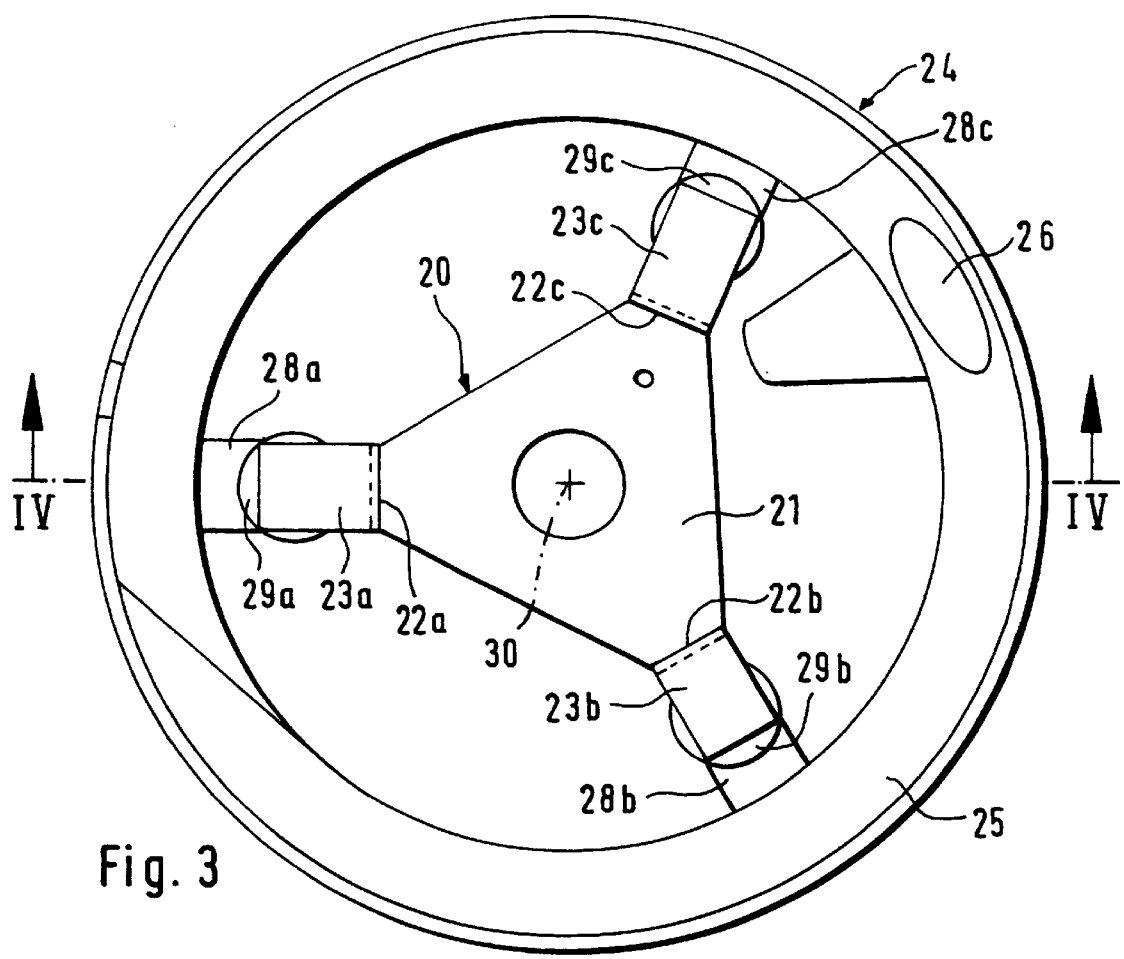
FIG. 3 is a top view of a motor holding device according to a preferred embodiment of the present invention with supporting elements inserted axially between the motor holder and the adapter.
Figure 4:
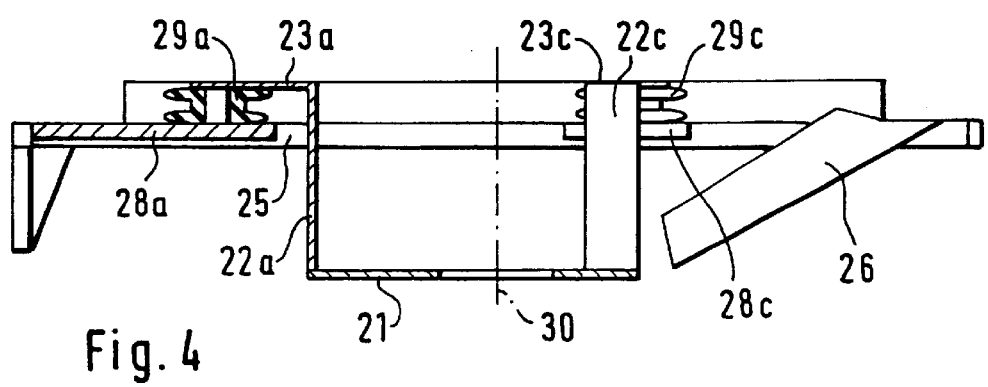
FIG. 4 is a sectional view along Line IV—IV of FIG. 3.

The holding device illustrated in FIGS. 3 and 4 has an adapter 20 which, as in the embodiment of FIG. 1, consists of a triangular bottom surface 21 for the fastening to a front end of an exterior motor component, such as a pole ring, and of three holding fingers 22a, 22b, 22c projecting axially from its triangular point areas, which holding fingers 22a, 22b, 22c, however, in the case of this adapter, are bent on their respective free end to form an end area 23a, 23b, 23c pointing radially to the outside. The adapter 20 is connected with a motor holder 24 which contains a ring 25 from which a cooling air nozzle 26 projects radially to the inside. From the motor holding ring 25, three fastening arms 28a, 28b, 28c project at an equidistant angular distance of 120° so far radially to the inside that they radially overlap with the bent holding finger end areas 23a, 23b, 23c. In this overlapping area, axially connecting supporting elements 29a, 29b, 29c are inserted which therefore establish the connection between the adapter 20 and the motor holder 24. While, in the case of the embodiment of FIGS. 1 and 2, the supporting elements are mainly stressed in the radial direction of the holding device, the supporting elements 29a, 29b, 29c are in this case stressed primarily in the axial direction, that is, in the direction of the longitudinal axis 30 of the adapter. Predominantly, pressure loads and no shearing stresses therefore occur of the supporting elements 29a, 29b, 29c. A favorable selection of materials consists of producing the adapter 20 and the motor holder 24 of a hard plastic material, particularly a thermoplastic material, such as polypropylene or polyamide, and producing the supporting elements 29a, 29b, 29c of a soft rubber-elastic plastic material, particularly of a thermoplastic elastomer, such as Styrene-Butadiene-Styrene (SBS), Styrene-Ethene-Butadiene-Styrene (SEBS), or Polypropylene/Ethylene-Propylene-Terpolymer (PP/EPDM). This selection of material permits the manufacture of the holding device in a common manufacturing process for the adapter 20, the motor holder 24 and the supporting elements 29a, 29b, 29c.

The construction with primarily axially stressed supporting elements 29a, 29b, 29c inserted between the holding finger areas 23a, 23b, 23c of the adapter 20 and the fastening arms 28a, 28b, 28c of the motor holder 24 axially spaced therefrom permits a sufficient uncoupling of vibrations also when the supporting elements 29a, 29b, 29c are situated outside the gravity plane of the motor. As the result of the axial height of the holding fingers 22a, 22b, 22c, which in comparison to the example of FIGS. 1 and 2 is clearly lower, the supporting elements 29a, 29b, 29c in the case of the holding device of FIGS. 1 and 4 are situated to be offset with respect to the transverse gravity plane of a fan motor to be held thereby on the side facing away from the fan wheel. As a result, a relatively large distance of the holding device from the fan wheel is obtained so that the flow action of the air taken in by the fan wheel is influenced little by the holding device. In addition to a good uncoupling of vibrations and the possibility of a two-component manufacturing in a single manufacturing tool, this holding device therefore has the additional advantage of a lower contribution to the development of flow noise.

Figure 5:
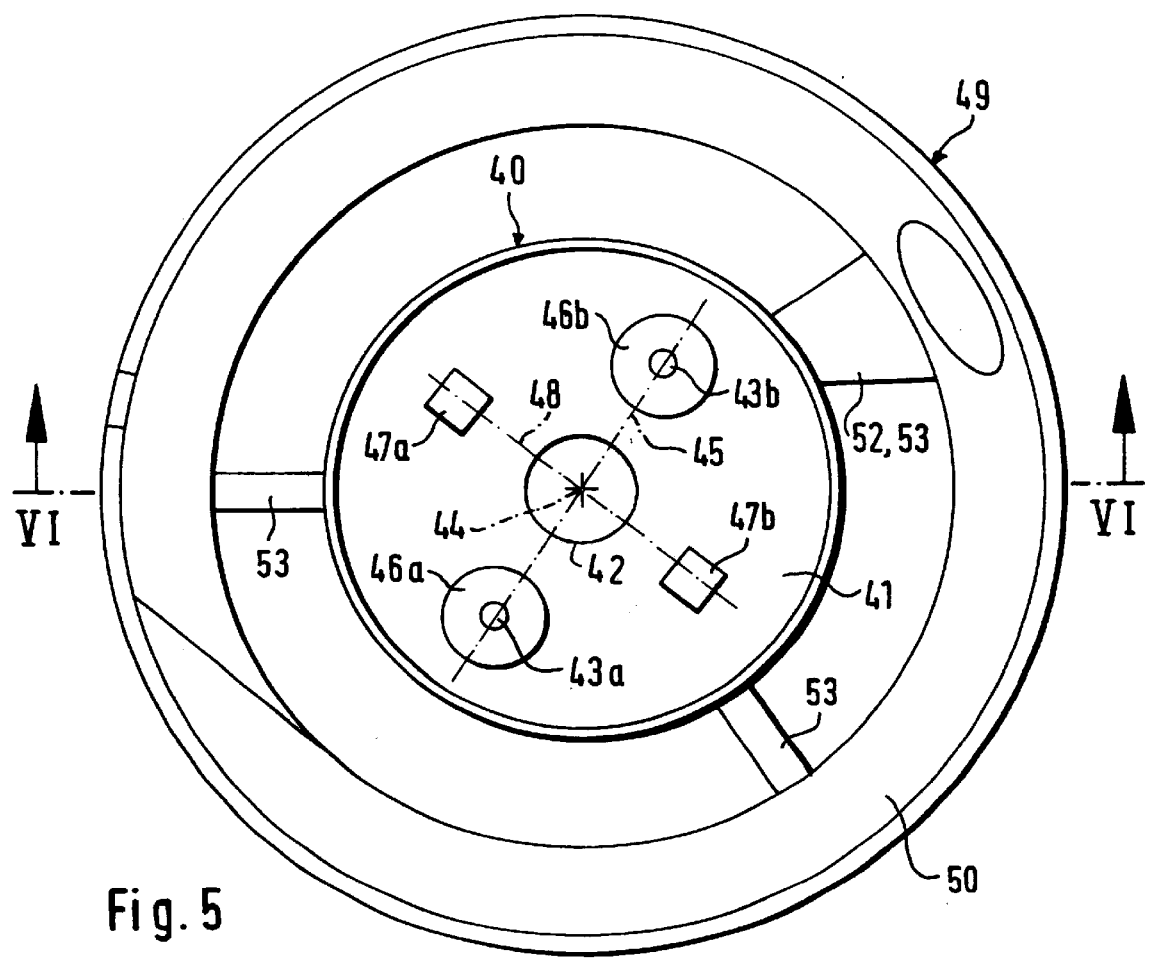
FIG. 5 is a top view of a motor holding device according to a preferred embodiment of the present invention with supporting elements inserted on the face-side between the adaptor and the motor.
Figure 6:
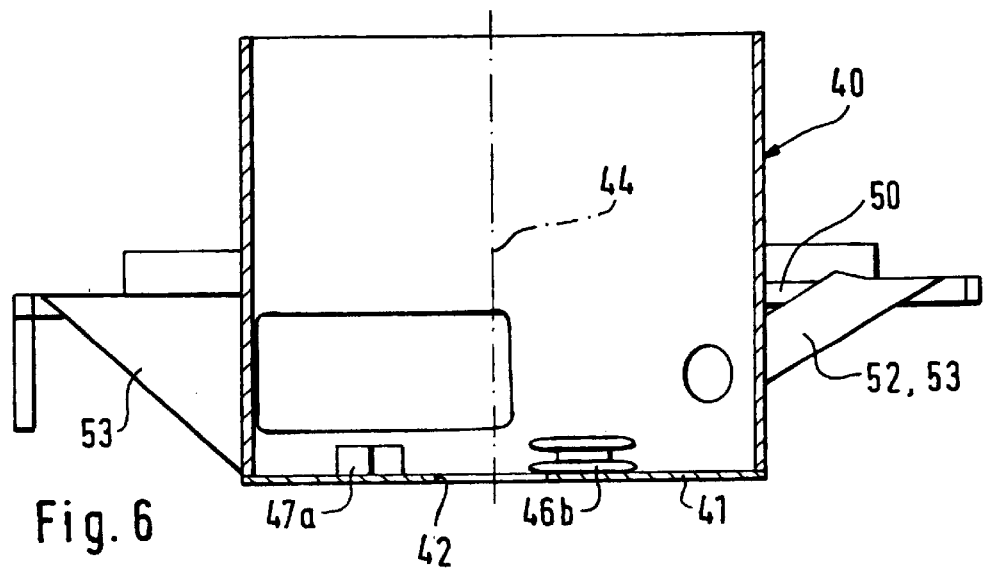
FIG. 6 is a sectional view along Line VI—VI of FIG. 5.

The holding device illustrated in FIGS. 5 and 6 has a cup-shaped adapter 40 with a circular bottom 41 which, in addition to a central through-opening 42, has two screw holes 43a, 43b which are situated at the same distance from the bottom center and thus from the longitudinal axis 44 of the adapter on a common first diameter line 45. Correspondingly, after the insertion of the motor to be held in the cup interior, the adapter 40 is screwed via two screws to the adjacent face of the exterior motor component, such as the pole ring. In this case, a vibration-uncoupling supporting element 46a, 46b made of a polypropylene material is provided for each screw and surrounds it so that the linking of the motor to the adapter 40 takes place by the screwed connections only via these supporting elements 46a, 46b without the existence of a direct contact of the exterior motor component with the adapter bottom 41 used as the fastening surface of the adapter 40. The buffered two-point screwed connection situated along the first diameter line 45 permits a slight pitching movement about this diameter line 45 which has a vibration-uncoupling effect. In order to limit the pitching movement and prevent a striking of the motor against the holding device, two rubber-elastic supporting elements 47a, 47b of the appropriate size are arranged on the interior side of the adapter bottom 41 and are diametrically opposite one another along a second diameter line 48 which extends approximately vertically to the first diameter line 45.

In the case of this holding device, the uncoupling of vibrations is therefore not implemented, as in the case of the previous example, on the motor holder—adapter connection but on the connection between the not shown motor and the adapter 40. A motor holder 49, which contains a ring 50 with a cooling air nozzle 52 pointing radially to the inside, carries the cup-shaped adapter 40 in a mechanically rigid manner by way of three fastening angles 53, of which one is integrated in the cooling air nozzle 52 and which, on the one side, are fixed to the motor holder ring 50 and, on the other side, are fixed to the cup shell of the adapter 40.

In the case of this holding device, the desired smooth running is therefore achieved by the elastic, vibration—uncoupling fastening of the motor holder—adapter complex to the face of an exterior motor components, for example, to a motor bottom. The cup shell of the adapter 40 provides a casing of the motor which effectively reduces the occurrence of disturbing noises. In this case, the adapter cup shell may project axially beyond the received motor housing at a respectively desired length. If the holding device is used, for example, for a fan motor with two fan flow channel stages arranged axially behind one another, the length of the adapter cup may be selected such that the latter extends axially beyond the motor housing to at least the inlet side of the first fan flow channel stage, preferably into the transition range of the two fan flow channel stages. The air taken in by the fan will then sweep on the exterior side along the smooth forward end area of the cup shell without flowing against the motor holder 49 or the motor housing received by the adapter 40, which minimizes connected flow noises.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A holding device for a motor comprising:
   a cup-shaped adapter having a bottom to be fixed to an exterior motor component;
   a motor holder fixedly connected with a shell surface of the adapter, and
   at least one vibration-uncoupling supporting element to be disposed between said bottom of the adapter and said exterior motor component,
   wherein the at least one vibration-uncoupling supporting element includes a plurality of vibration-uncoupling supporting elements which in use support the exterior motor component at locations spaced from one another, and
   wherein the bottom of the adapter is to be fixed on an end of the exterior motor component at points situated on a first diameter line with the insertion of first ones of the supporting elements, second ones of the supporting elements being arranged between the bottom of the adapter and the end of the exterior motor component outside of said first diameter line.

2. A holding device according to claim 1, wherein said motor operates a multi-flow-channel fan, the cup-shaped adapter having a open cup end area extending axially at least to a height of an inlet area of a first of several fan flow channel stages situated axially behind one another.

3. A holding device according to claim 1, comprising at least two of said first ones of the supporting elements, and at least two of said second ones of the supporting elements.

4. A holding device according to claim 1, wherein respective ones of the supporting elements are formed as separate elastomeric numbers.

5. A holding device according to claim 1, wherein said second ones of the supporting elements are disposed on a second diameter line which is perpendicular to the first diameter line.

6. A holding device according to claim 5, wherein respective ones of the supporting elements are formed as separate elastomeric numbers.

7. A holding device according to claim 1, wherein said bottom of the cup-shaped adapter defines at least two screw holes.

8. A holding device according to claim 7, wherein a respective one of said supporting elements is provided for each of said at least two screw holes, each of said supporting elements defining an opening to be arranged coaxially with said respective screw hole.

9. A holding device according to claim 8, wherein said screw holes are disposed on said first diameter line.

10. A holding device according to claim 9, wherein said second ones of the supporting elements are disposed on a second diameter line which is perpendicular to the first diameter line.

11. A holding device according to claim 10, wherein said second ones of the supporting elements do not have screw holes.

12. A holding device according to claim 11, wherein respective ones of the supporting elements are formed as separate elastomeric numbers.

13. A holding device comprising:
    a cup-shaped adapter having a bottom to be fixed to an exterior motor component;
    a motor holder connected with a shell surface of the adapter, and
    at least one vibration-uncoupling supporting element to be disposed between said bottom of the adapter and said exterior motor component,
    wherein a motor operates a multi-flow-channel fan, the cup-shaped adapter having an open cup end area extending axially at least to a height of an inlet area of a first of several fan flow channel stages situated axially behind one another.

14. A holding device according to claim 13, wherein the at least one vibration-uncoupling supporting element includes a plurality of separate vibration-uncoupling supporting elements that are spaced from one another.

15. A holding device according to claim 13, wherein said bottom of the cup-shaped adapter defines at least two screw holes.

16. A holding device according to claim 15, wherein a respective one of said supporting elements is provided for each of said at least two screw holes, each of said supporting elements defining an opening to be arranged coaxially with said respective screw hole.

17. A holding device comprising:
    a cup-shaped adapter of a hard material having a bottom to be fixed to an exterior motor component;
    a motor holder connected with a shell surface of the adapter; and
    at least one vibration-uncoupling supporting element to be disposed between said bottom of the adapter and said exterior motor component,
    wherein said bottom of the cup-shaped adapter defines at least two screw holes, and
    wherein a respective said supporting element is provided for each of said at least two screw holes, each of said supporting elements defining an opening to be arranged coaxially with said respective screw hole.

18. A holding device according to claim 17, wherein the at least one vibration-uncoupling supporting element includes a plurality of separate vibration-uncoupling supporting elements that are spaced from one another.

19. A holding device comprising:
    a cup-shaped adapter of a hard material having a bottom to be fixed to an exterior motor component;
    a motor holder connected with a shell surface of the adapter; and
    at least one vibration-uncoupling supporting element to be disposed between said bottom of the adapter and said exterior motor component;
    wherein said bottom of the cup-shaped adapter defines at least two screw holes; and
    wherein the at least one vibration-uncoupling supporting element includes a plurality of separate vibration-uncoupling supporting elements that are spaced from one another.

20. A holding device for a motor, comprising:
    a cup-shaped adapter of hard material having a bottom to be fixed to an exterior motor component disposed in use in the cup-shaped adapter;
    a motor holder fixedly connected with a shell surface of the adapter; and
    at least one vibration-uncoupling supporting element separate from the adapter and disposable in use between said bottom of the adapter and said exterior motor component;

wherein said bottom of the cup-shaped adapter defines at least two screw holes;

wherein said at least one supporting element is a plurality of supporting elements; and wherein a respective one of said supporting elements is provided for each of said at least two screw holes, each of said supporting elements defining an opening to be arranged coaxially with said respective screw hole.

21. A holding device for a motor, comprising:

a cup-shaped adapter of hard material having a bottom to be fixed to an exterior motor component disposed in use in the cup-shaped adapter;

a motor holder fixedly connected with a shell surface of the adapter; and at least one vibration-uncoupling supporting element separate from the adapter and disposable in use between said bottom of the adapter and said exterior motor component;

wherein said bottom of the cup-shaped adapter defines at least two screw holes; and wherein a respective said supporting element is provided for each of said at least two screw holes, each of said supporting elements defining an opening to be arranged coaxially with said respective screw hole.

* * * * *